(12) United States Patent
Hoffman et al.

(10) Patent No.: US 11,810,147 B2
(45) Date of Patent: Nov. 7, 2023

(54) AUTOMATED ATTRIBUTION MODELING AND MEASUREMENT

(71) Applicant: Foursquare Labs, Inc., New York, NY (US)

(72) Inventors: Jon Hoffman, New York, NY (US); Adam Poswolsky, Great Neck, NY (US); Robert Stewart, Brooklyn, NY (US)

(73) Assignee: Foursquare Labs, Inc., New York, NY (US)

( * ) Notice: Subject to any disclaimer, the term of this patent is extended or adjusted under 35 U.S.C. 154(b) by 619 days.

(21) Appl. No.: 15/788,547

(22) Filed: Oct. 19, 2017

(65) Prior Publication Data
US 2019/0122251 A1    Apr. 25, 2019

(51) Int. Cl.
*G06Q 30/0242*    (2023.01)

(52) U.S. Cl.
CPC .................. *G06Q 30/0242* (2013.01)

(58) Field of Classification Search
CPC .................................................. G06F 16/387
See application file for complete search history.

(56) References Cited

U.S. PATENT DOCUMENTS

| | | | | |
|---|---|---|---|---|
| 10,152,458 | B1 * | 12/2018 | Stepaniants | G06Q 30/0202 |
| 10,204,359 | B1 * | 2/2019 | Lee | G06Q 30/0267 |
| 10,368,744 | B1 * | 8/2019 | Miller | A61B 5/01 |
| 2010/0114668 | A1 * | 5/2010 | Klein | G06Q 30/0243 |
| | | | | 705/14.42 |
| 2012/0166520 | A1 * | 6/2012 | Lindsay | G06F 3/0488 |
| | | | | 709/203 |
| 2014/0156387 | A1 | 6/2014 | Bruich et al. | |
| 2015/0012355 | A1 * | 1/2015 | Efrat | G06Q 30/0254 |
| | | | | 705/14.52 |
| 2015/0067075 | A1 * | 3/2015 | Sheppard | H04L 51/52 |
| | | | | 709/206 |

(Continued)

FOREIGN PATENT DOCUMENTS

| | | | | |
|---|---|---|---|---|
| CA | 2753085 | A1 * | 9/2010 | G06Q 30/02 |
| EP | 2216747 | A2 * | 8/2010 | G06Q 30/02 |
| KR | 10-1118741 | | 3/2012 | |

OTHER PUBLICATIONS

Kirkpatrick, David, "Foursquare's new tool connects in-store visits to digital ads", Feb. 23, 2016, MarketingDive, https://web.archive.org/web/20160229172320/https://www.marketingdive.com/news/foursquares-new-tool-connects-in-store-visits-to-digital-ads/414329/ (Year: 2016).*

(Continued)

*Primary Examiner* — Michael Bekerman
*Assistant Examiner* — Scott Snider

(57) ABSTRACT

The present disclosure relates to systems and methods for automatic attribution modeling and measurement. In aspects, a system may receive identification information associated with profiles and electronic devices that were exposed to a certain piece of targeted content. The demographic and device data associated with the individuals who were exposed to the targeted content are used to create a control group of individuals who were not exposed to that targeted content. The real-world visit rates of the exposed group and the control group to one or more locations may be monitored over a period of time (or campaign) and evaluated to assess the effectiveness of the targeted content.

20 Claims, 5 Drawing Sheets

(56) References Cited

U.S. PATENT DOCUMENTS

| | | | |
|---|---|---|---|
| 2015/0193813 A1* | 7/2015 | Toupet | G06Q 50/01 |
| | | | 705/14.41 |
| 2015/0348095 A1 | 12/2015 | Dixon et al. | |
| 2016/0189217 A1 | 6/2016 | Burgess et al. | |
| 2016/0247175 A1* | 8/2016 | Milton | H04W 4/029 |
| 2016/0321551 A1* | 11/2016 | Priness | G06Q 30/0261 |
| 2017/0132658 A1 | 5/2017 | Luo et al. | |
| 2017/0148050 A1* | 5/2017 | Montero | G06Q 10/063 |
| 2017/0214674 A1* | 7/2017 | Bakshi | G06Q 50/01 |

OTHER PUBLICATIONS

Brian Dalessandro, Claudia Perlich, Ori Stitelman, and Foster Provost. 2012. Causally motivated attribution for online advertising. In Proceedings of the Sixth International Workshop on Data Mining for Online Advertising and Internet Economy (ADKDD '12). Association for Computing Machinery, (Cont'd) (Year: 2012) New York, NY, USA, Article 7, 1-9. https://doi.org/10.1145/2351356.2351363 (Year: 2012).*

L. Deng, J. Gao and C. Vuppalapati, "Building a Big Data Analytics Service Framework for Mobile Advertising and Marketing," 2015 IEEE First International Conference on Big Data Computing Service and Applications, Redwood City, CA, USA, 2015, pp. 256-266, doi: 10.1109/BigDataService.2015.27. (Year: 2015).*

PCT International Search Report and Written Opinion in PCT/US2018/056133, dated Feb. 8, 2019, 13 pages.

International Preliminary Report on Patentability dated Apr. 30, 2020 for Application No. PCT/US2018/056133, 9 pages.

European Patent Application No. 18 868 782.6, Extended European Search Report dated May 20, 2021, 8 pages.

* cited by examiner

AUTOMATED ATTRIBUTION MODELING AND MEASUREMENT

BACKGROUND

Attribution is the identification of a set of user actions ("events" or "touchpoints") that contribute in some manner to a desired outcome, and assigning value to each of these actions. In conventional digital content ecosystems, attribution techniques are often used to measure the effectiveness of advertisements. Generally, these measurements are generated over extended time periods (e.g., weeks or months). For example, merchants customarily wait weeks or more to synchronize credit card data with targeted content campaigns in order to assess the performance of the campaigns. As such, receiving feedback to optimize campaign performance in near real-time has been a largely unattainable proposition.

It is with respect to these and other general considerations that embodiments have been described. In addition, although relatively specific problems have been discussed, it should be understood that the embodiments should not be limited to solving the specific problems identified in the background.

SUMMARY

The disclosure generally relates to a system and methods for automated attribution modeling and measurement using real-world visit data. An attribution model is the set of rules by which the value of each event is determined. In aspects, attribution modeling may refer to single source attribution, where the model is focused on one event, such as the last click, the first click, or the last channel to display the targeted content. In further aspects, attribution modeling may refer to fractional attribution, which includes equal weights. Equal weight models give the same amount of credit to each event through the conversion process of a potential buyer/customer. In yet further aspects, attribution modeling may refer to algorithmic or probabilistic attribution, which uses statistical modeling and machine learning techniques to derive the probability of a potential customer converting to an actual customer across all events preceding the conversion.

In digital content ecosystems, a unique identifier may be associated with each device that interacts with targeted content. These unique identifiers may be used to create an "exposed" group, which represents a set of people who were exposed to specific targeted content. In examples, people may be exposed to targeted content by physically visiting one or more locations, or by viewing digital content using, for instance, a computing device. The unique identifier associated with each user of the exposed group may be used to extract specific features about a specific user, including, but not limited to, age, gender, ethnicity, geographic location, language, and customer loyalty. These extracted features may be used to create a control group of profiles that emulate the values of the extracted features. The control group may not be exposed to the specific targeted content. By constructing both a control group and an exposed group, one or more algorithms may be executed on data related to the behavior of the control group and exposed group to determine the effectiveness of the targeted content. As a result, targeted campaigns can be rapidly optimized in almost real-time.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Figure 1:
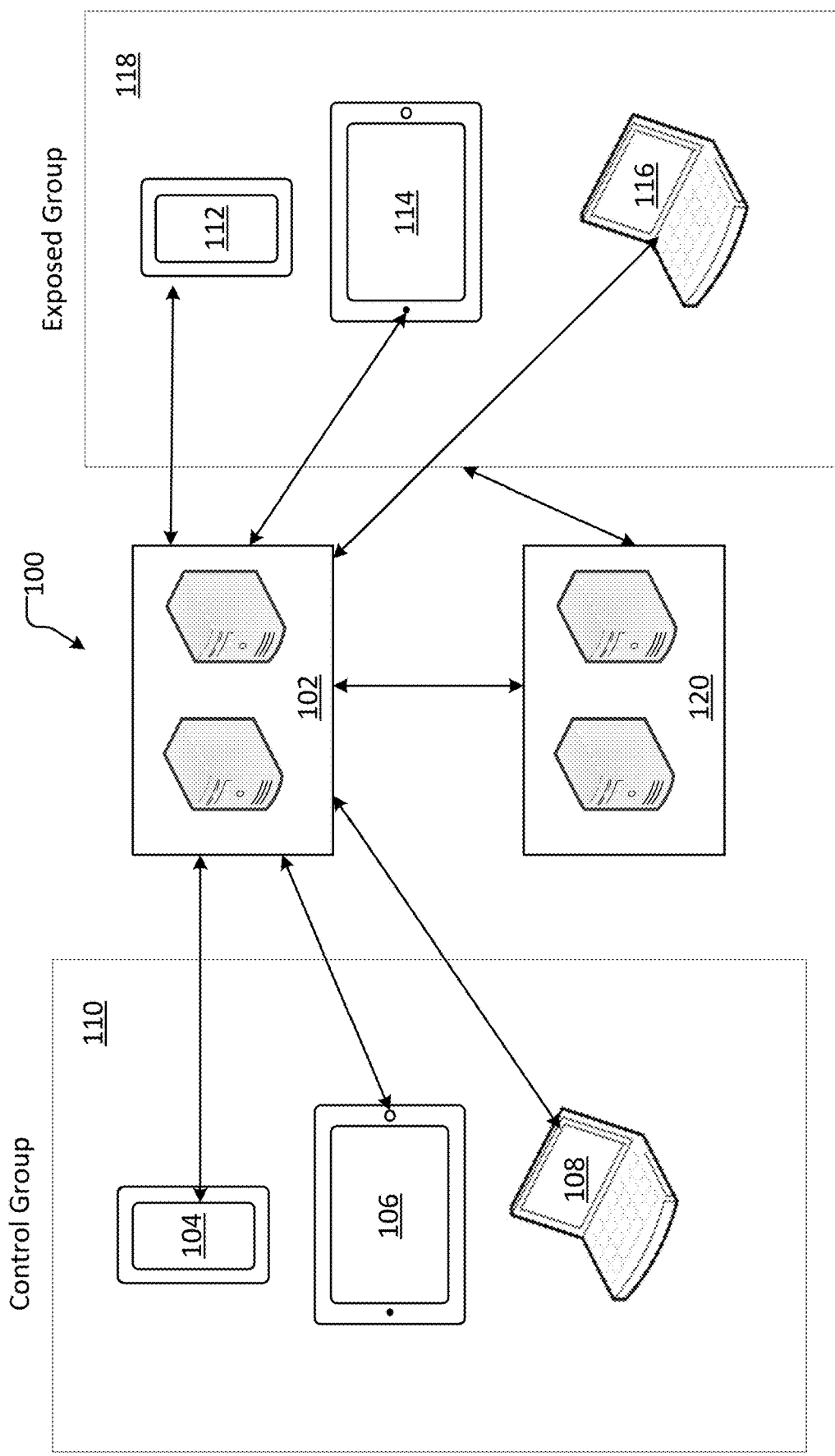
FIG. 1 illustrates an example of a distributed system for receiving and processing data related to automatic attribution modeling and measurement.

In the following detailed description, reference is made to the accompanying drawings that form a part hereof, and in which are shown exemplary aspects by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

Targeted content managers and distributors often desire to know the effectiveness of their targeted content. Specifically, these managers/distributors want to know which demographics are most affected by their targeted content. In order to discover which demographics are most affected, targeted content attribution can be used to quantify the influence each targeted content impression has on a potential consumer's decision to make a purchase decision. Targeted content attribution comprises rapidly collecting data on potential consumers, automatically processing that data for comparison, and using that data to empirically test the effectiveness of targeted content. As detailed above, the present disclosure relates to systems and methods for automatic attribution modeling and measurement. The webpages and applications disclosed herein may be executed and displayed on a variety of different devices with various hardware and software configurations. These devices may include, among others, a laptop computer, a mobile phone, a tablet, a head-mounted display, and a wearable device (e.g., smart watch).

Previously, solutions for testing the effectiveness of targeted content involved reliance upon credit card statements and financial data that was not immediately accessible following the exposure of the targeted content. Other deficient solutions include manually comparing a potential customer who was exposed to the targeted content with a potential customer that was not exposed. Manual comparisons of large groups of potential customers is difficult to complete in a short amount of time. Furthermore, manual comparisons typically rely on self-reporting accuracy, rather than collecting concrete data from an electronic device. The combination of manual comparisons with delayed analysis has created a significant need among targeted content managers and distributors for near-real-time results regarding the effectiveness of targeted content.

By leveraging an already-established profile database of individuals and associated electronic devices, the present disclosure solves the significant need among targeted content managers and distributors in nearly real-time by using one or more algorithms to match individuals who were exposed to the targeted content with individuals from the database who were not exposed to the targeted content. In some example aspects, each individual profile may be associated with a physical, electronic device equipped with GPS location capabilities and reporting. These electronic device GPS locations may be cross-referenced against a location-intelligent database that accurately reports the location of an electronic device (and therefore, the user) with high precision (e.g., within feet of the electronic device). For example, if a bar and a coffee shop are adjacent to one another, the bar may receive considerably more foot traffic during the evening than the coffee shop, but the coffee shop may receive considerably more foot traffic during the day than the bar. Such insights regarding the time of day, hours of operation, and demographic information of customers that visit the bar and/or the coffee shop, allow the location-intelligent database to provide precise results.

In further example aspects, the data gathered from electronic devices may be used to create one or more algorithms for automatically modeling and measuring targeted content attribution. For instance, a stream of input data from a group of individuals exposed to targeted content may be segmented into various demographic characteristics. Those demographic characteristics may be automatically extracted and used to create a similar group of individuals from the already-established profile database. Both groups may be automatically monitored over a set period of time. In some example aspects, the monitoring may involve recording and storing the number of visits to a location and/or location-specific data. In other example aspects, the monitoring may involve recording clicks and subsequently calculating metrics, such as cost per click (CPC) or cost per thousand impressions (CPM). In yet further example aspects, the monitoring may involve automatically recording a combination of data, including, but not limited to, a combination of location-specific data and conversion data (e.g., how many site visitors actually turn into paying customers).

The disclosed system of automatically modeling and measuring attribution improves technological systems in numerous ways. For example, the disclosed system may be able to receive, process, and compare profiles of potential customers and their associated electronic device data more quickly and efficiently than conventional attribution systems (and humans). Such efficiencies may conserve electronic resources, like battery power, on the device side; and processing, memory, and network resources on both the webpage/application provider side and the device side. Furthermore, utilizing a distributed system to receive, process, store, and compare electronic device data may allow memory to be more uniformly distributed across devices involved in the system, ultimately resulting in faster processing speed and a more dynamic allocation of memory. As the profile database, the location-intelligent database, and other datasets continue to grow, the machine learning components may continue to become more precise. In sum, more accuracy and precision in determining the effectiveness of targeted content through automatic attribution modeling and measurement results in a more efficient use of device resources, network resources, and system memory, allowing for faster processing speeds and immediate customer deliverables.

FIG. 1 illustrates an example of a distributed system for receiving and processing data related to automatic attribution modeling and measurement. A system 100 that facilitates the real-time uploading and processing of electronic device data for automatically modeling and measuring attribution may be executed on a variety of electronic devices including, but not limited to, client devices such as mobile phones 104 and 112, tablets 106 and 114, and personal computers 108 and 116. System 100 may be configured to receive and store data from one or more users. In examples, the users may correspond to a panel. A panel, as used herein, may refer to a group of active users for which system 100 has currently or previously acquired information. In at least one example, a panel may comprise total group of users from which one or more subgroup may be selected. For instance, the panel of users may be used to create control group 110. Control group 110 may consist of previously known users and associated electronic devices stored in a profile database on servers 102. Such information that may be collected (or has already been collected) from the control group 110 may include gender, age, location data, ethnicity, language, purchase histories, and recency, frequency, and monetary (RFM) data. RFM analysis is a technique used in conjunction with measuring the effectiveness of targeted content. RFM may be used to quantitatively determine which customers are most likely to act upon a certain piece of targeted content by examining how recently a customer purchased (recency), how often a customer purchases (frequency), and how much a customer spends (monetary). Servers 102 may store this information for future attribution modeling and measurement analysis with future input data. As new input data continues to be received and processed by severs 102, that input data is converted into historical data that may be added to the already-established profile database. The profile database may continue to grow as new input data is received.

In some example aspects, servers 102 may receive new input data from the exposed group 118. The panel of users may be used to create exposed group 118. The exposed group 118 may refer to a group of individuals and their associated electronic devices that have been exposed to certain targeted content. In some examples, the individuals that are exposed to a certain piece of targeted content are already in the profile database, and therefore, electronic device identification data is already stored. In other examples, the individuals that are exposed to a certain piece of targeted content are not already in the profile database. As a result, system 100 may prompt an individual to allow system 100 to receive certain electronic device and profile data from the individual's electronic device. If the individual agrees to allow system 100 to receive certain data, then the data (e.g., gender, age, location data, language, ethnicity, education level, purchase histories, social media profiles, RFM data, etc.) may be transferred to servers 102 and stored for future analysis and comparison. In at least one aspect, any user in exposed group 118 may not simultaneously be in control group 110.

In yet other example aspects, third-party servers 120 may deliver the profile and electronic device data to servers 102. A third-party may initially use servers 120 to conduct its own targeted content campaign and record profile and electronic device data of the individuals who received the targeted content. The third party may then pass this information from servers 120 to servers 102. In some aspects, servers 120 may receive the previously mentioned data (e.g., gender, age, location data, language, ethnicity, education level, purchase histories, social media profiles, RFM data, etc.) directly from the devices 112, 114, and 116 in the exposed group 118. The third-party servers 120 may store this data and then transmit it to servers 102 for processing and automatic attribution modeling and measurement.

In example aspects, requests for permission to access certain profile data and electronic device data may be transmitted from the servers 102 directly to the devices 112, 114, and 116 in the exposed group 118. Alternatively, these requests may be transmitted to third-party servers 120, wherein the request is subsequently transmitted to the devices in the exposed group 118. Similarly, requests to install a tracking mechanism (e.g., tracking pixel) on electronic devices in the exposed group 118 may be transmitted directly from servers 102, or the requests may be transmitted through the third-party servers 120. In other example aspects, requests to receive and process data, including requests to install a tracking mechanism, may be transmitted according to other methods known to persons of ordinary skill in the art. In some aspects, system 100 may track a certain profile across multiple electronic devices. For example, if a user is exposed to a piece of targeted content on a personal computer 116, data received from a mobile device 112 associated with that same user will be cross-referenced with the fact that the user was previously exposed to that targeted content on a different device. Servers 102 may receive data related to the exposure of targeted content from personal computer 116, and subsequently, since a user has now been exposed to targeted content, servers 102 may receive location-specific data from mobile device 112. A similar user identification mechanism may be shared across all electronic devices associated with that specific user. As a result, more accurate automatic attribution modeling and measurement may be conducted.

Figure 2:
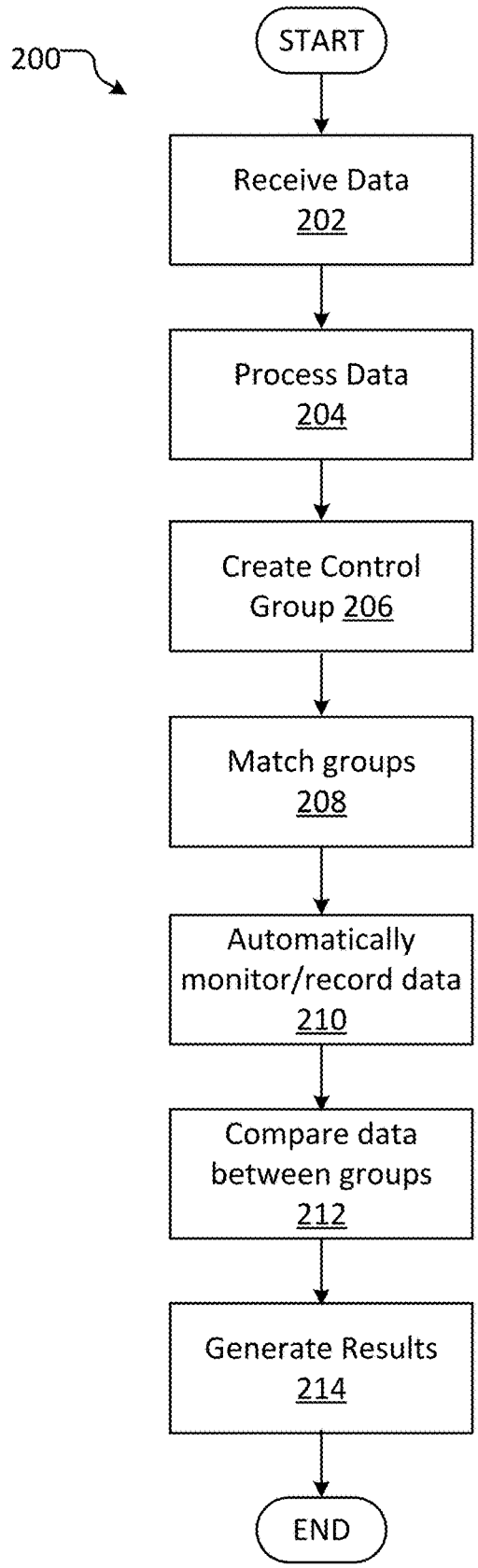
FIG. 2 is a block diagram illustrating an example method for automatically modeling and measuring attribution.

FIG. 2 is a block diagram illustrating an example method for automatically modeling and measuring attribution. Example method 200 begins with receive data operation 202, where data may be received. The data may refer to data from a control group 110 and/or an exposed group 118. As described previously, the systems disclosed herein may be executed upon an already-established profile database with profiles and a location-intelligent database with precise locations. The data that may be received includes, but is not limited to, device data and demographic data. Device data may include, but is not limited to, device features, operating environment characteristics, user preferences or settings, webpage and/or application identification data, battery life, etc. Device features may include, but are not limited to, hardware specifications such as dimensions, weight, CPU, GPU, RAM, storage, memory cards, display, resolution, battery, operating system, camera, SIM card, Wi-Fi, USV capability, Bluetooth capability, sensors, etc. Demographic features, as discussed previously, may include, but are not limited to, gender, age, location data, language, ethnicity, race, education level, purchase histories, social media profiles, RFM data, etc. System 200 may receive all of or a portion of the aforementioned information related to a device and/or a profile at receive data operation 202.

At process data operation 204, the system may then analyze the device data and the profile data. System 200 may be configured to extract a certain set of device and/or demographic characteristics. The data may then be automatically segmented according to device and/or demographic characteristics. According to the pre-selected device and/or demographic characteristics, the corresponding values from the data may be extracted. The extracted data may be compared with characteristic classifiers and/or statistical models to determine the proper classification of one or more characteristics. For example, a demographic characteristic of 21-24 year-olds may be associated with age. The value "21-24 years" may be extracted and compared against statistical models specific for a certain group of profiles and targeted content. If the targeted content is shown to be primarily effective upon people of 21-24 years old and noticeably less effective on people of 50-53 years old, the classification of the 21-24 year old attribute may receive a higher importance rating than a profile with "50-53 years" in the age characteristic value. After one or more characteristics are assessed, then the aggregate of all characteristics may be analyzed and subsequently compared to other groups of individuals (e.g., an exposed group may be compared to a control group). The processing data operation 204 is further described in FIG. 3.

After the data is processed in operation 204, a control group may be created in operation 206. A control group may comprise profiles with the demographic and/or device characteristics similar to the exposed group. For example, an exposed group may contain a profile of a male in his late 50's who has a master's degree and speaks Spanish, and a profile of a female in her early 30's who has two kids and works as a software engineer. The control group may mirror those demographic characteristics as closely as reasonably possible. As such, system 200 may attempt to create a control group with at least one male in his late 50's who has a master's degree and speaks Spanish, and a female in her early 30s who has two kids and works as a software engineer. In aspects, although the profiles of the control group may resemble the profiles of the exposed group, no members of the exposed group are added to the control group.

In some aspects, an exact match between the profiles of the exposed group and the profiles of the control group may not be possible. In such scenarios, fuzzy matching may be applied. Fuzzy matching refers to normalizing datasets within certain boundaries. For example, datasets may comprise features; these features may be featurized to generate feature scores. The features scores may be normalized to values between 0.0 and 1.0; the feature scores may then be used to create feature vectors. The feature scores of the feature vectors may then be compared to a boundary or threshold value, such as a commonality threshold, to determine linkages and/or correspondences between the features and feature scores. The boundaries may be pre-programmed, or the boundaries may be intelligently selected according to a machine-learning algorithm. For example, the fuzzy matching boundaries may be set at a plus or minus 5-year deviation. As such, a male in the control group and in his early 50's may be determined to be a match to a man in the exposed group and in his late 50's.

After the control group is created in operation 206, or in conjunction with the creation of the control group at operation 206, one or more control group profiles may be matched with an exposed group profile at operation 208. The control group may be created in operation 206 by evaluating the aggregate of demographic and device data received from the exposed group. Each profile that is created in the control group may resemble (at least to some degree) a profile from the exposed group. In aspects, the profile matches may be one-to-one (e.g., one profile from the control group is matched to one profile from the exposed group), or one control profile may be linked to multiple exposed group profiles. For example, if two profiles in the exposed group are similar, a single profile may be generated in the control group to represent the two profiles from the exposed group. In alternate aspects, a profile from the control group may not be sufficiently matched to any profile in the exposed group. The unmatched profile from the control group may be omitted from the analysis and/or deleted. For example, an exposed group may comprise a profile for a Mandarin-speaking male in his late 50's. The panel of active user profiles, from which the control group is selected, may comprise a Mandarin-speaking female in her early 30's. Based on the Mandarin-speaking feature of the exposed profile, the profile of the Mandarin-speaking female may be selected. However, during the matching process, one or more algorithms may be used to determine that the profile of the Mandarin-speaking female is inadequately similar to the exposed profile of the Mandarin-speaking male. For instance, the amount of dissimilar features between the two profiles may be larger than the amount of similar features. Alternately, one or more profile features may have scores or weights corresponding to the perceived or relative importance of a feature with respect to another feature or set of features. In either example, a comparison algorithm may be used to compare and/or evaluate the features of the two profiles. The comparison algorithm may evaluate the compared data against a threshold value or rule set. When the comparison algorithm determines that compared profiles are insufficiently similar, the profile of the control group may be removed or omitted from further analysis.

Once the control group is created and the profiles in the control group are linked to profiles from the exposed group, then system 200 may automatically monitor the profiles from both the control and the exposed groups at operation 210. Monitoring the profiles may refer to receiving device data from the electronic devices associated with the profiles of both the control and the exposed groups. In some example aspects, the device data that may be received may include, but is not limited to, click-log data and location data. Click-log data may refer to the web elements and applications "clicked" during a period of time. The location data of the electronic devices may be used to determine the effectiveness of the targeted content. For example, the exposed group may be identified as a group that has been exposed to certain targeted content from Company X, whereas the control group may be identified as a group that has not been exposed to certain targeted content from Company X. If an individual in the exposed group visits a Company X store after being exposed to the targeted content, this may indicate that the targeted content was effective. Conversely, if an individual in the control group with the same profile as the individual in the exposed group visits a Company X store, as well, this may indicate that the targeted content did not have as great an impact on the exposed group as expected. Alternatively, it may indicate that other factors besides the targeted content may have influenced the individual of the exposed group to visit a Company X store. Moreover, such a comparison may suggest that another motivating factor drove the individuals from the exposed and control groups to the store, not the targeted content.

During the automatic monitoring operation 210, the location data of the electronic devices from the exposed and control groups may be analyzed for a period of time. This period of time may range from hours to years, or may also include real-time processing (e.g., constant analysis). The time between exposure to the targeted content and arrival at a store associated with that targeted content may be received and processed. Additionally, the number of times an individual returns to a store associated with the targeted content may be recorded and processed.

Once the data is aggregated from the automatic monitoring operation 210, the data may then be compared in operation 212. In some example aspects, the location data of the electronic devices in the exposed group may be compared with the location data of the electronic devices in the control group. In other example aspects, the location data of the electronic devices, along with click-log data, purchase histories, and RFM data, may be analyzed and compared across the exposed and control groups at operation 212. For example, an individual from the exposed group may have purchased a certain item or visited a certain location after being exposed to targeted content, whereas a similar individual from the control group may not have purchased that certain item or visited that same location during the same timeframe. Such comparisons are suggestive of an effective targeted content campaign.

Once the data is compared, results are generated by displaying relevant data points of each profile in the exposed group next to the control group at operation 214. If the exposed group electronic device data indicates a majority of individuals visited (e.g., physically or online) a certain store associated with the targeted content more frequently than the individuals from the control group, that may suggest that the targeted content was effective, meaning the targeted content increased traffic to a certain store or product. Specifically, the results may be organized according to demographic and/or device characteristics, such that the end-user may be able to clearly identify the demographic group that was most affected by the targeted content and which demographic group was least affected by the targeted content. In further example aspects, results may be generated in the form of a dashboard, illustrating the differences between matching profiles from the exposed group and the control group.

Figure 3:
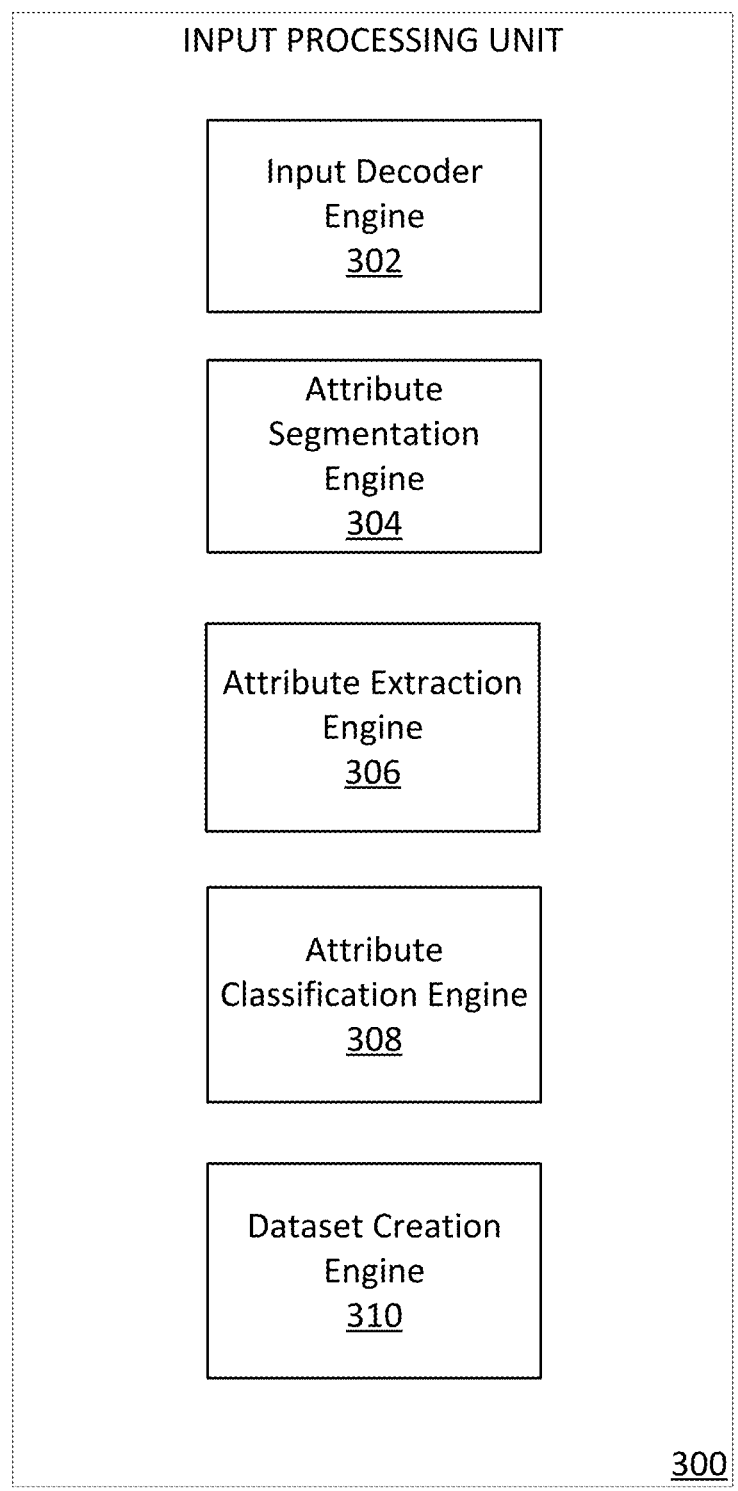
FIG. 3 is a block diagram illustrating an input processing unit for automatically modeling and measuring attribution.

FIG. 3 is a block diagram illustrating an input processing unit for automatically modeling and measuring attribution. Input processing unit 300 may be configured to receive inputs. In some example aspects, input processing unit 300 may be configured to process input data automatically according to machine learning algorithms. The machine learning algorithms may be trained using datasets associated with a preexisting profile database of individuals and their electronic device data, and a preexisting location-intelligent database of precise locations. The inputs that are fed to the input processing unit 300 may comprise data related to the exposed group. In other example aspects, the inputs may comprise data related to the control group. In further example aspects, the inputs may comprise data that is a combination of both the exposed group and the control group. For example, the exposed group inputs may include, but are not limited to, demographic and/or device characteristics, along with any information related to the targeted content to which the exposed group has been exposed. In some aspects, input processing unit 300 may be configured to receive inputs through the input decoder engine 302. The inputs that the input processing unit 300 may receive may comprise raw data that may not be machine-readable. To convert the raw data to machine-readable data, input decoder engine 302 is configured to accept raw data and use a data conversion scheme to transform the raw data into machine-readable data. The data conversion scheme may comprise normalizing the data and structuring the data so that the data may be consistent when it is subsequently fed to the other engines within the input processing unit 300. For example, an exposed group input may consist of a GPS location in the form of latitude and longitude. The input decoder engine 302 may convert the GPS location data into a pattern of machine-readable bits (e.g., an array structure) that can be analyzed easily and efficiently by the input processing unit 300. In other example aspects, the data received from the input processing unit 300 may already be in machine-readable format. In this example aspect, the input decoder engine 302 may detect that the input data is already in a pattern of machine-readable bits and requires no further conversion. The input decoder engine 302 may then send the input data to attribute segmentation engine 304 for further processing.

Attribute segmentation engine 304 may be configured to accept data and segment the appropriate attributes from that data. The appropriate attributes may be different according to a database of preselected segmentation attributes. The attribute segmentation engine 304 may be configured to communicate with this database of preselected segmentation attributes. In some example aspects, the database may be located within the same electronic device as the input processing unit 300. In other example aspects, the database may be remote and housed on a cloud-based server. The attribute segmentation engine 304 is configured to identify certain attributes within the input data and segment those attributes. For example, a third party may desire to know whether certain targeted content was effective on males between the ages of 40 and 45. In this example, attribute segmentation engine 304 would identify gender and age attributes, and segment those attributes from the rest of the input data. In some example aspects, each portion of the input data may be segmented by the attribute segmentation engine 304. By segmenting each portion of the input data, unforeseen data trends may be exposed. In other example aspects, not all of the input data may need to be segmented. For example, as the third party is interested in whether certain targeted content was effective only on males between the ages of 40 and 45, other attributes, such as language, ethnicity, education level, etc. may not be segmented from the input data by the attribute segmentation engine 304. After the input data has been segmented by the attribute segmentation engine 304, the input data may then be sent to the attribute extraction engine 306.

Attribute extraction engine 306 may be configured to extract attribute values from the segmented attributes of the input data. For example, attribute extraction engine 306 may extract the value "male" (or the machine-readable binary form thereof) from the gender attribute, or extraction engine 306 may extract a coordinate from the GPS location data attribute. After extracting the values, attribute extraction function 306 may compare the extracted values to statistical models and/or an attribute classifiers database. In some example aspects, the statistical models and attribute classifiers may be stored in a local database housed within the same electronic device as input processing unit 300. In other example aspects, the statistical models and attribute classifiers may be stored in a remote database housed on a cloud-based server. The attribute extraction engine 306 may compare the input data values with values from the statistical models. The statistical models may be created from machine-learning algorithms that utilize neural networks. The statistical models may be structured according to historical data related to targeted content and past-targeted content campaigns. Furthermore, the statistical models may be constructed from demographic and device data from historical exposed and control groups that were associated with certain targeted content campaigns. After the attribute extraction engine 306 extracts the values from the inputs, the values may be sent to the attribute classification engine 308.

Attribute classification engine 308 may be configured to compare the extracted values of the input data attributes against statistical models and/or attribute classifiers in order to determine extracted values or to determine the extracted value's classification. For example, an attribute value of 25 years old may be classified as an "age" attribute. An attribute value of "female" may be classified as a "gender" attribute. In other example aspects, the extracted attribute values may be compared against preexisting attribute classifiers according to pre-selected classifiers from a third party, or the attribute classifiers may be automatically established from consistently similar data recorded over time. For example, a targeted content manager or distributor may focus on age and gender attributes for a certain targeted content campaign. However, the output of the statistical models and the attribute classifier database may indicate that the attribute classifications of language and education level are more indicative of the effectiveness of a certain targeted content campaign than the attribute classifications of gender and age.

In other example aspects, input processing unit 300 may receive imperfect data, such as data that is missing certain attributes. For instance, an individual may have only given the system disclosed herein permission to receive location data, but not gender or age data. However, input processing unit 300 may have the ability to crosscheck the location data of an electronic device with the location-intelligent database and determine to which stores and areas that person has traveled. For example, if the location data of an electronic device indicates that the person frequently goes to Forever 21, a high school, and a gymnastics studio, the output of the statistical models may predict that the person is a female between the ages of 15 and 18. This prediction, according to the statistical models, may be given a certainty score, ranking the confidence of the statistical model predictions. Certainty scores may increase as more data is assembled and compared. After the most important attributes are segmented, extracted, and classified, a dataset of the exposed group may be generated by a dataset creation engine 310.

Dataset creation engine 310 may be configured to produce a formatted and human-readable dataset. The dataset may produce human-readable data that indicates segmented attributes, extracted values, and/or classified attributes. Data creation engine 310 may produce a dataset that may be in the form of an array or a hash table to facilitate an efficient comparison with the other data. In some example aspects, the dataset creation engine 310 may automatically format this data according to pre-selected parameters. In other example aspects, the output of the dataset creation engine 310 may be manually edited before further analysis.

The processing and comparison techniques implemented by input processing unit 300 may be performed on a single input processing unit 300. In other example aspects, the components described in FIG. 3 may be housed on separate input processing units. For example, attribute segmentation engine 304 may be housed on input processing unit 300, but attribute extraction engine 306 may be housed on a separate input processing unit that communicates with input processing unit 300 (e.g., through a shared network or via other network protocols). Furthermore, the dataset creation engine 310 described herein may be housed in the same electronic device as the input processing unit 300, or in other example aspects, the dataset creation engine 310 may be housed on another electronic device that communicates with the device housing input processing unit 300.

Figure 4:
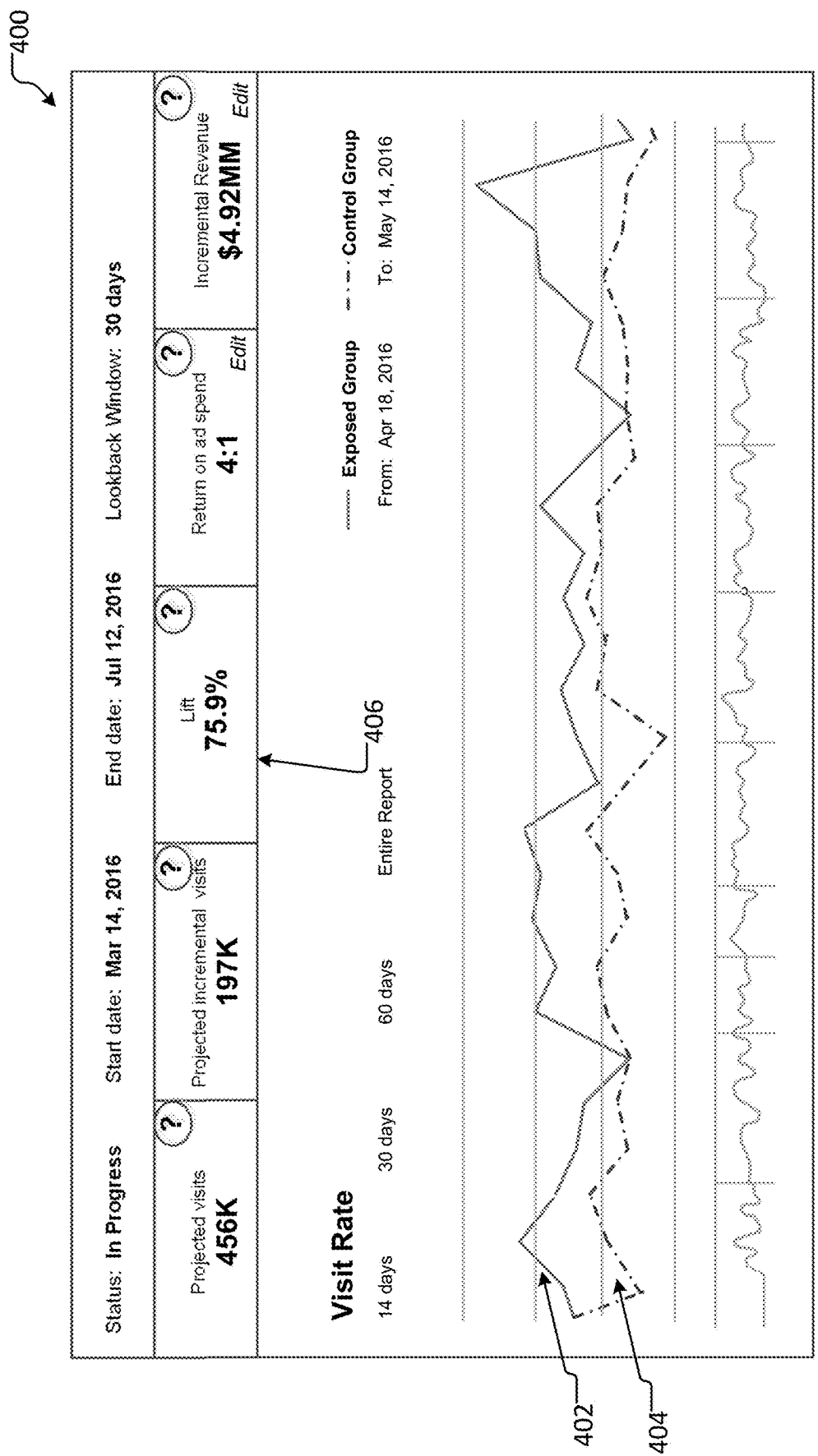
FIG. 4 illustrates an example of a dashboard for automatically modeling and measuring attribution.

FIG. 4 illustrates an example of a dashboard for automatically modeling and measuring attribution. Example dashboard 400 may enable a user to visually analyze the effectiveness of a targeted content campaign. In aspects, dashboard 400 may represent the result of automatically modeling and measuring attribution, as described in FIG. 2. Dashboard 400 may comprise a variety of dashboard elements, including but not limited to, status, projected visits, projected incremental visits, "lift," incremental revenue, etc. As illustrated, the top line is the exposed group line 402, and the bottom line is the control group line 404. Overall, the exposed group line 402 is higher than the control group line 404. Indeed, the "lift" of the exposed group line is 75.9% higher than the control group line 404 as indicated by the lift value 406. This suggests that the targeted content had an overall positive effect (e.g., more individuals visited the site that were exposed to the targeted content than individuals who were not exposed to the targeted content) on the individuals who were exposed to the targeted content. In other example aspects, a dashboard may illustrate more nuanced differences among the different pairs of profiles of the exposed group and the control group. For instance, a user may select a certain pair of profiles and analyze the differences between the profiles. From this perspective, behavior upon exposure to the targeted content can be measured and even predicted.

As should be appreciated, the various methods, devices, components, etc., described with respect to FIGS. 1-4 are not intended to limit the corresponding systems to being performed by the particular components described. Accordingly, additional topology configurations may be used to practice the methods and systems herein and/or components described may be excluded without departing from the methods and systems disclosed herein.

Figure 5:
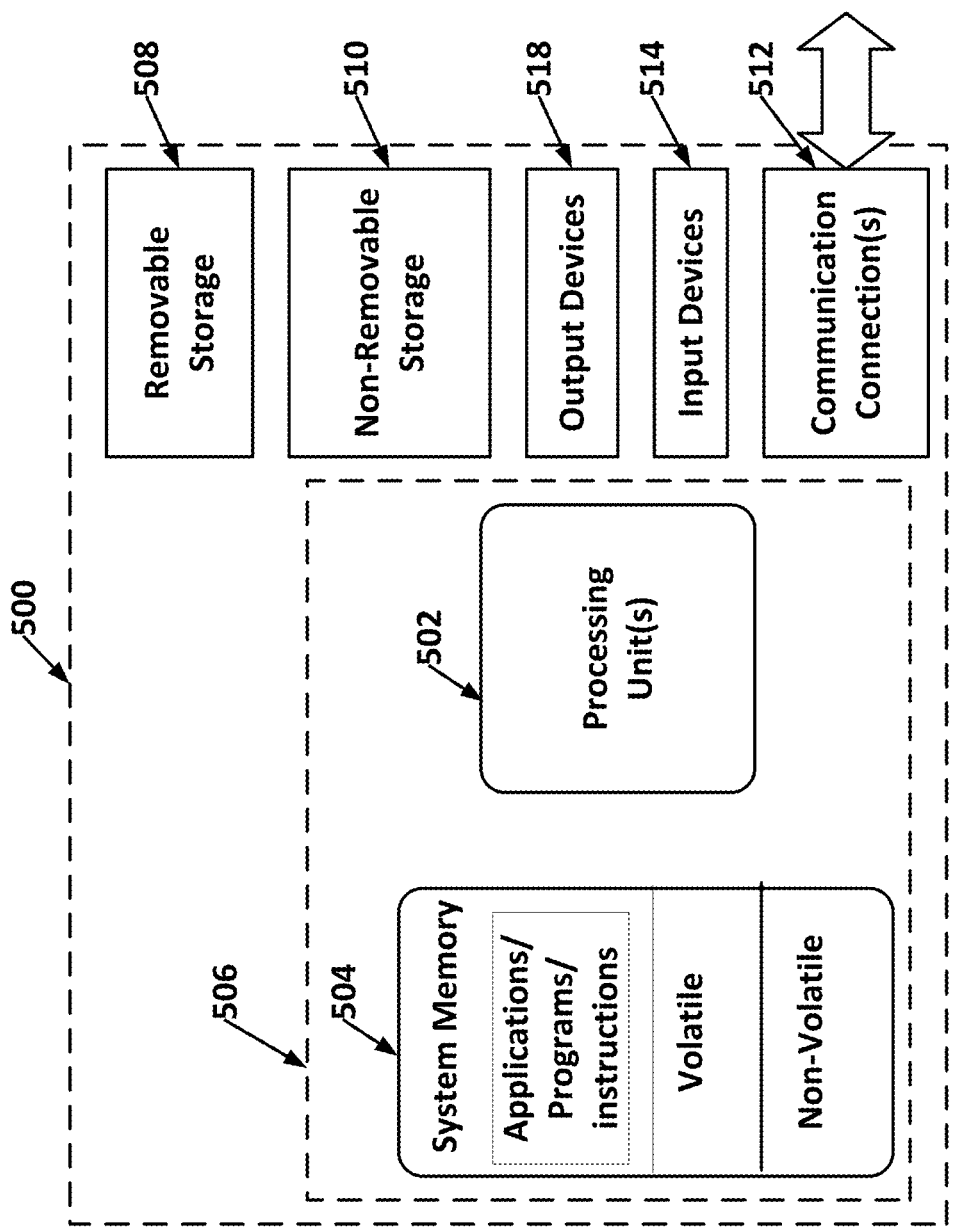
FIG. 5 illustrates one example of a suitable operating environment in which one or more of the present embodiments may be implemented.

FIG. 5 illustrates a suitable operating environment for the automatic attribution modeling and measurement system described in FIG. 1. In its most basic configuration, operating environment 500 typically includes at least one processing unit 502 and memory 504. Depending on the exact configuration and type of computing device, memory 504 (storing instructions to perform the automated attribution techniques disclosed herein) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc. In embodiments, the connections may be operable to facility point-to-point communications, connection-oriented communications, connectionless communications, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A system comprising:
   at least one processor; and
   memory coupled to the at least one processor, the memory comprising computer executable instructions that, when executed by the at least one processor, performs a method comprising:
   receiving data from at least one electronic device in an exposed group;
   processing data from the at least one electronic device;
   creating at least one control group using the data based at least upon a commonality threshold for one or more features, wherein the commonality threshold is determined in accordance with a machine-learning algorithm that receives both non-exposed user profile information and exposed user-profile information as input, wherein the machine learning algorithm is trained using a historical dataset comprising information associated with a preexisting profile database of both exposed and non-exposed individuals from prior campaigns, their associated electronic device data, and a dataset comprising location information from a location-intelligent database;
   matching at least one profile from the at least one control group with at least one profile from the exposed group;
   automatically monitoring, for a predetermined period of time following the matching, electronic device data associated with:
      a first device of the matched at least one profile from the control group; and
      a second device of the matched at least one profile from the exposed group, wherein the profiles associated with the first device and the second device have been matched with each other;
   comparing the electronic device data for the first device and the second device; and
   generating at least one result for at least one of the exposed group and at least one of the control group based on the comparison.

2. The system of claim 1, wherein the exposed group and the control group are selected from a panel of active users, wherein the panel corresponds to an already-established profile database of individuals and associated electronic devices.

3. The system of claim 2, wherein creating at least one control group comprises:
   determining a first set of profiles in the exposed group;
   evaluating the first set of profiles to determine a first set of characteristics;
   comparing the first set of characteristics to a second set of characteristics second in a second set of profiles in the panel to identify commonalities between the first set of profiles and the second set of profiles; and
   selecting the profiles having commonalities for inclusion in the at least one control group.

4. The system of claim 3, wherein matching the at least one profile from the at least one control group with at the least one profile from the exposed group comprises identifying the commonalities between the first set of profiles and the second set of profiles using a fuzzy matching technique.

5. The system of claim 4, wherein the fuzzy matching technique comprises:
   normalizing the first set of characteristics and the second set of characteristics;
   generating a first feature vector for the first set of characteristics and a second feature vector for the second set of characteristics; and
   comparing the first feature vector to the second feature vector.

6. The system of claim 1, wherein the data is associated with targeted content for one or more online campaigns, and the data comprises at least one of device data for the at least one electronic device and demographic data for one or more users associated with the at least one electronic device.

7. The system of claim 6, wherein the exposed group is exposed to the targeted content and the control group is not exposed to the targeted content.

8. The system of claim 1, wherein processing the data comprises:
   extracting a set of characteristics from the data;
   comparing the extracted set of characteristics to at least one of a characteristic classifier and a statistical model to determine the proper classification of one or more characteristics in the set of characteristics; and
   segmenting the classified one or more characteristics into one or more groups.

9. The system of claim 8, wherein the one or more groups correspond to demographic characteristics of members of the exposed group.

10. The system of claim 1, wherein the monitoring comprises recording visit data for the at least one control group and the exposed group, wherein the visit data corresponds to at least one of click-log data and location data.

11. The system of claim 1, wherein comparing the electronic device data comprises evaluating at least two of location data, click-log data, purchase histories, and recency, frequency, and monetary data.

12. The system of claim 1, wherein generating the at least one result comprises displaying one or more relevant data points of the at least one profile from the at least one control group and the at least one profile from the exposed group.

13. The system of claim 1, wherein generating the at least one result comprises determining the effectiveness of a targeted content campaign.

14. The system of claim 13, wherein the effectiveness of a targeted content campaign is determined by evaluating whether a location associated with targeted content is visited more frequently by members of the exposed group than by members of the control group.

15. A method for performing real-time attribution modeling and measurement, the method comprising:
   receiving data from an exposed group, wherein the exposed group has been exposed to targeted content;
   processing data from the exposed group;
   creating at least one control group using the data based at least upon a commonality threshold for one or more features, wherein the commonality threshold is determined in accordance with a machine-learning algorithm that receives both non-exposed user profile information and exposed user-profile information as input, wherein the machine learning algorithm is trained using a historical dataset comprising information associated with a preexisting profile database of both exposed and non-exposed individuals from prior campaigns, their associated electronic device data, and a dataset comprising location information from a location-intelligent database;

matching one or more profiles from the control group with one or more profiles from the exposed group;

automatically monitoring, for a predetermined period of time following the matching device data associated with:
- a first device of the matched one or more profiles from the control group; and
- a second device of the matched one or more profiles from the exposed group, wherein the profiles associated with the first device and the second device have been matched with each other; and evaluating the device data from the first device and the second device to generate a result.

16. The method of claim 15, wherein the exposed group and the control group are selected from a panel of active users, wherein the panel corresponds to an already-established profile database of individuals and associated electronic devices.

17. The method of claim 16, wherein processing data from the exposed group comprises using one or more algorithms to identify members of the panel that have not been exposed to the targeted content and share commonalities with one or members of the exposed group.

18. The method of claim 17, wherein matching one or more profiles from the control group with one or more profiles from the exposed group comprises determining whether the commonalities shared by the exposed group and the control panel exceed a commonality threshold.

19. The method of claim 15, wherein generating the result comprises determining the effectiveness of a targeted content campaign by evaluating whether a location associated with the targeted content is visited more frequently by members of the exposed group than by members of the control group.

20. A non-transitory computer readable memory encoding computer executable instructions that, when executed by at least one processor, perform a method for performing real-time attribution modeling and measurement, the method comprising:

receiving data from an exposed group, wherein the exposed group has been exposed to targeted content;

processing data from the exposed group, wherein the processing comprises attributing the data;

creating at least one control group using the data based at least upon a commonality threshold for one or more features, wherein the commonality threshold is determined in accordance with a machine-learning algorithm that receives both non-exposed user profile information and exposed user-profile information as input, wherein the machine learning algorithm is trained using a historical dataset comprising information associated with a preexisting profile database of both exposed and non-exposed individuals from prior campaigns, their associated electronic device data, and a dataset comprising location information from a location-intelligent database;

matching one or more profiles from the control group with one or more profiles from the exposed group;

automatically monitoring, for a predetermined period of time following the matching, device data associated with:
- a first device of the matched at least one profile from the control group; and
- a second device of the matched at least one profile from the exposed group, wherein the profiles associated with the first device and the second device have been matched with each other; and comparing the device data for the first device and the second device to determine the effectiveness of the targeted content by evaluating whether a location associated with the targeted content is visited more frequently by members of the exposed group than by members of the control group.

* * * * *